Figure 1:
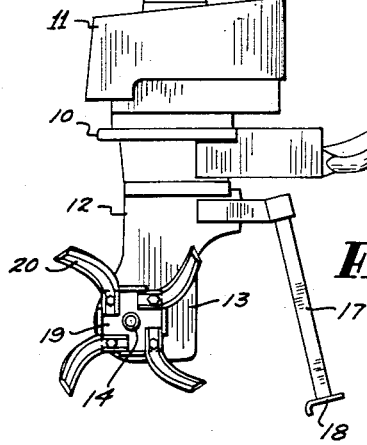

Oct. 6, 1964  F. H. FIELD  3,151,685
REVERSIBLE TINES
Filed May 27, 1960

INVENTOR.
FRANK H. FIELD,
BY Allen & Allen
ATTORNEYS.

United States Patent Office 3,151,685
Patented Oct. 6, 1964

3,151,685
REVERSIBLE TINES
Frank H. Field, Cincinnati, Ohio, assignor, by mesne assignments, to Magna American Corporation, Cincinnati, Ohio, a corporation of Ohio
Filed May 27, 1960, Ser. No. 32,376
1 Claim. (Cl. 172—556)

This invention resides in the provision of a tine arrangement whereby a given tine, without change to the tine itself, may be utilized for tilling purposes and the like either as a pick tine or as a slicer tine.

In the description to follow the invention will be described as applied to garden tiller units although it will be apparent to those skilled in the art that the invention may have wider application.

In tilling gardens with units of the type to be described it is often desirable to have the tines arranged so as to effect what is known in the trade as a pick action. This action is aggressive and results in deeper and faster tilling. One drawback, however, is that ground cover such as weeds and grass has a decided tendency to ride back on the tines and wrap around the tines and tine shaft, thus impairing the operation. It is sometimes desirable, therefore, to have tines which will produce a slicing action. While the action so produced is not so aggressive as the pick action, ground cover has a tendency to slide off rather than ride back and at times this is quite desirable.

In the past it has been necessary to utilize either a pick tine, designed as such, or a slicer tine, designed as such, in order to produce the desired operations. This leads to duplication and increased expense and trouble.

A very important object of this invention is to provide a single tine, or a single set of tines, which may be arranged to produce either a pick action or a slicing action as desired.

Another object of the invention is to produce an arrangement wherein the conversion from pick tine action to slicer tine action and vice versa may be accomplished simply and quickly.

A further object of the invention is to produce a tine assembly which is durable and which will operate effectively either in the pick position or slicing position.

Figure 2:
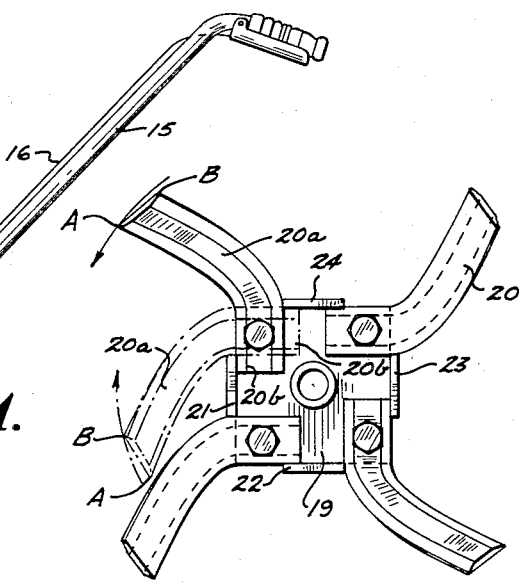
Figure 3:
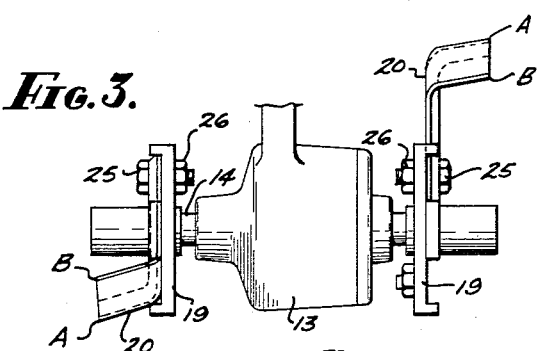
Figure 4:
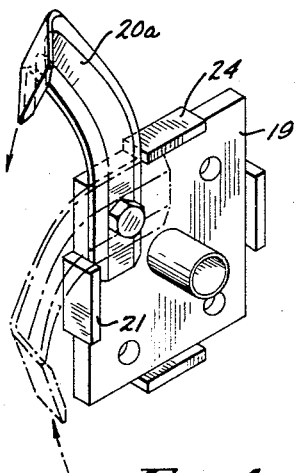
Figure 5:
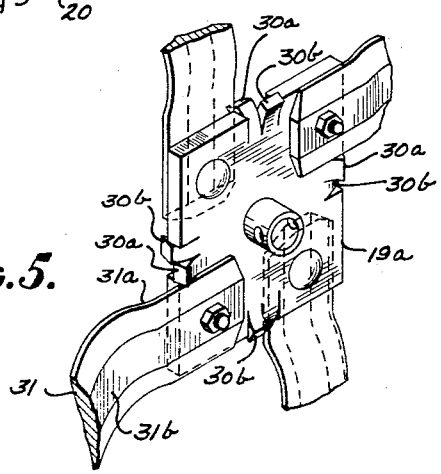

Referring now to the drawings, in which drawings like numerals are employed to designate like parts throughout, and in which:

FIGURE 1 is a side elevation of a typical tiller unit to which the invention may be applied, FIGURE 2 is a side elevation of one tine assembly illustrating, in full lines, the position of the tines when in the pick position and, in dotted lines, the position of one of the tines when in the slicing position, FIGURE 3 is a fragmentary rear view of a tiller showing the position of one tine when in the pick position (the right side of this figure) and of the same tine when in the slicing position (the left side of this figure), FIGURE 4 is a perspective view of a part of the tine assembly, and FIGURE 5 is a perspective view of a portion of a modified tine assembly.

A typical tiller unit to which the invention may be applied comprises a frame 10 on which is mounted a motor 11 having a suitable drive, not shown, through the housing 12 to the transmission box 13 to drive the tine shaft 14. The unit may be guided by the handles 15, controlled by the clutch cable 16 and tilling regulated by the stake 17 which may have a plow member or the like 18 fixed thereto. The unit as so far described is old and well known in the art.

Mounted on the tine shaft 14 are a plurality of plates 19 to which are fixed a plurality of tines 20. Referring now particularly to FIGURE 2, wherein one modification of the invention is illustrated, it will be observed that the plate 19 is shown as having four tines 20 fixed thereon. These tines are arranged in the pick position so that when the tines are rotated in counterclockwise direction as viewed in this figure the point A will strike the ground first while the point B of the tine will trail. As illustrated by the solid arrow in this figure there is a rake or clearance angle between the points A and B as so moved. This angle is important and is necessary in order to produce good aggressive tilling action. If there were not such a clearance angle the tine would have a tendency to bounce off the ground rather than to dig into it. Extending from the plate 19 are four lugs 21, 22, 23 and 24. Considering now the tine 20a in FIGURE 2, which tine is identical with the others shown, as the tine assembly is rotated in the pick direction the lower end 20b of this tine will abut the lugs 21 and 24 which, coupled with the bolt 25, secures the tines in position. Preferably the bolt 25 is the type known in the trade as a body bond bolt with which is used a lock nut 26.

By means of the body bond bolt 25 and lock nut 26, each of the tines 20 has a pressure fit on the plate 19. This fit, however, will permit the tine to change its position on the plate when it comes into contact with the ground under certain conditions as will be explained.

In order to obtain a slicing action, the tine assembly shown in FIGURE 2 in full lines is transferred to the opposite side of the transmission housing 13, and the same side of the tine assembly is kept towards said housing. This, in effect, means that the assembly is now being rotated clockwise as illustrated by the dotted line arrow in FIGURE 2. When this happens the tine 20a, upon striking the ground, will be moved so that the bottom portion 20b thereof strikes the lug 24, the tine thus taking the position shown in dotted lines in FIGURE 2. Now it will be seen that the ground is first struck by the point B while the point A trails. Again, however, by this arrangement there is provided the necessary clearance or rake between the points B and A. This condition, wherein the pick point A trails, is the slicer action heretofore mentioned.

Considering FIGURE 2, if one simply took the tine assembly illustrated in full lines and changed its relative position on the tine shaft 14 with respect to the transmission housing 13, no provision being made for individual movement of an individual tine, the result would be that the end of the tine would simply slap the ground and tend to bounce off the ground rather than dig into it. Neither of the points A or B would enter the ground in positive manner. By the arrangement of this invention, however, the individual tine is moved with respect to the plate 19 so as to produce the actions just described. Although a tight, slip fit of the tine 20 on the plate 19 is shown, it will be obvious to those skilled in the art that other arrangements by which the position of the tine is changed on the plate between the positions indicated, may be used.

Referring now to FIGURE 3, at the right side of this figure there is illustrated a single tine 20 fixed on a plate 19 mounted on the tine shaft 14. This view is taken from the rear or operator's side of the housing 13. The tine 20, still considering the right side of this FIGURE 3 only, and referring particularly to the points A and B, is moving in the pick direction, that is, the top of this tine is moving away from the operator.

The left side of FIGURE 3 illustrates the position of the same tine 20 discussed in connection with the right side of this figure, when such tine has been transferred to the left side of the transmission housing 13 (keeping the same side of the plate 19 towards the housing 13)

and when it has changed its position on the plate 19. The shaft 14 is still operating in the same direction but now this tine 20, at the left side of FIGURE 3, is effecting a slicing action rather than a pick action. And this has been accomplished simply by changing the respective position of the tine 20 with respect to the housing 13 and by effecting a change in position of the tine 20 on its plate 19, all as described.

As is best seen in FIGURES 2 and 4, in order to produce the necessary clearance angle when the tine is changed from its pick position to its slicer position or vice versa, it is necessary to move the tine on the plate about one-quarter of a turn. To summarize, when the point A strikes the ground first, point B trailing, and there is a clearance between these points, then a good pick action is obtained. Conversely, when the point B strikes the ground first, and the point A trails, and there is again a sufficient clearance angle between the points B and A, a good slicing action is obtained. In this invention, this change is effected by, considering a single tine only, changing its direction of rotation and its respective position on the tine plate. In practice, by the preferred form of this invention, it is necessary only to move a tine plate from one side of the housing 13 to the other side thereof, keeping the same side of the plate towards said housing 13, for the tight slip fit will automatically permit the individual tines to change their positions on the plate when they strike the ground. If desired this could be done manually.

Referring now to FIGURE 5, a modification of the invention will be described. In this modification the tine plate 19a has a group of lugs 30a and 30b formed integral with the plate, these several lugs 30a and 30b replacing the lugs 21, 22, 23 and 24 used with the tine plate 19 of FIGURE 2. These lugs 30a and 30b may be formed directly from the plate 19a by, for each pair of lugs, cutting through the plate with three parallel cuts and then bending the plate material between cuts first in one direction to form the lug 30a and then in the other direction to form the lug 30b. These lugs 30a and 30b are those against which the various tines abut when they are in one or the other of their two positions, depending on whether a pick action or a slicing action is desired, as above explained. Also, the tines at diametrically opposite corners of the plate 19a are located on one side of the plate, while the other pair of tines located at the other diametrically opposed corners of the plate 19a are located on the opposite side of this plate. This makes it possible for the broader and thicker portion of each tine to abut the plate 19a, thus giving added strength to the tine assembly. This also means that the edge of the tine which strikes the various lugs, strikes these lugs closer to the face of the plate and, therefore, closer to the base of the lug, than would otherwise be the case.

Considering tine 31 in FIGURE 5, if this tine were mounted on the opposite side of the plate 19a, then the tine edge 31 would strike its respective lug at a point towards the outward end of the lug, which point would also be spaced from the face of the plate. This is true because the raised surface 31b would be that which would abut the plate 19a. By arranging the tines 31 in the manner illustrated in FIGURE 5, however, all of the raised portions corresponding to that indicated at 31b will be outward of the respective face of the plate 19a to which each tine 31 is secured. And, as noted, each tine edge 31a will strike its respective lug adjacent the base of the lug and close to the face of the plate 19a.

It will be apparent to those skilled in the art that modifications in this invention may be made without departing from the scope and spirit thereof. Also, while the invention has been shown as embodied in certain particular structures and arrangements, the invention is not to be limited to these arrangements and structures except insofar as they are specifically set forth in the subjoined claim.

Having thus described the invention, what is claimed as new and what is desired to be protected by United States Letters Patent is:

A tine assembly for use on a rotating shaft which comprises a plate; a plurality of tines on said plate; each said tine having a pick point and a slice point; said tines having a normal position on said plate whereby said pick point leads and there is a rake angle between said pick point and said slice point; and means for turning the tines from said normal position through about one-quarter of a turn on said plate so that when said slice point leads there is a rake angle between said slice point and said pick point; whereby, when the tines are considered as rotating in a given direction, a pick action is obtained and whereby, when the tines are considered as operating in an opposite direction, and said tines have moved said one-quarter turn, a slicing action is obtained, in which the means for turning the tine comprises means for securing the tines to the plate with a tight slip fit, said plate having lugs against which said tines abut, whereby when the direction of rotation of said assembly is changed said tines slip through about one-quarter of a turn from against one lug to the next succeeding lug.

References Cited in the file of this patent

UNITED STATES PATENTS

| | | |
|---|---|---|
| 416,982 | Young | Dec. 10, 1889 |
| 1,500,502 | Kuhn | July 8, 1924 |
| 2,582,482 | Edwards | Jan. 15, 1952 |
| 2,903,077 | Kamlukin | Sept. 8, 1959 |
| 2,943,687 | Merry et al. | July 5, 1960 |

FOREIGN PATENTS

| | | |
|---|---|---|
| 74,507 | Austria | Aug. 26, 1918 |